V. MIKULECKY.
MUD GRIP FOR AUTOMOBILE WHEELS.
APPLICATION FILED NOV. 13, 1920.
1,375,716.
Patented Apr. 26, 1921.
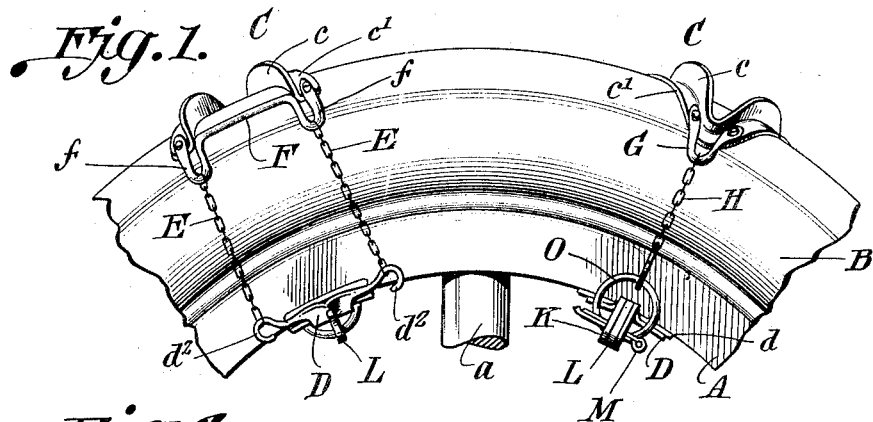
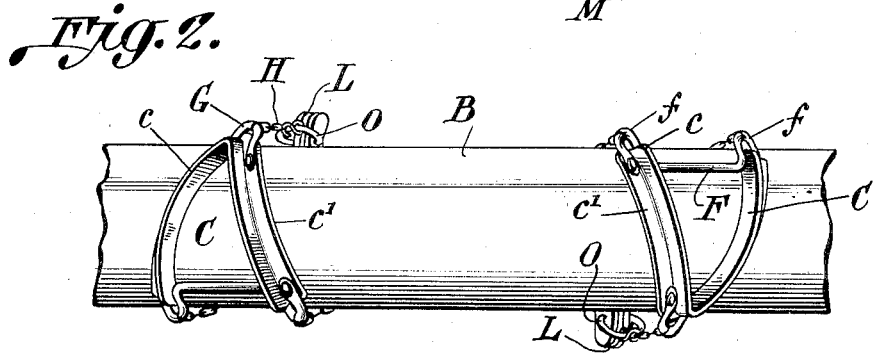
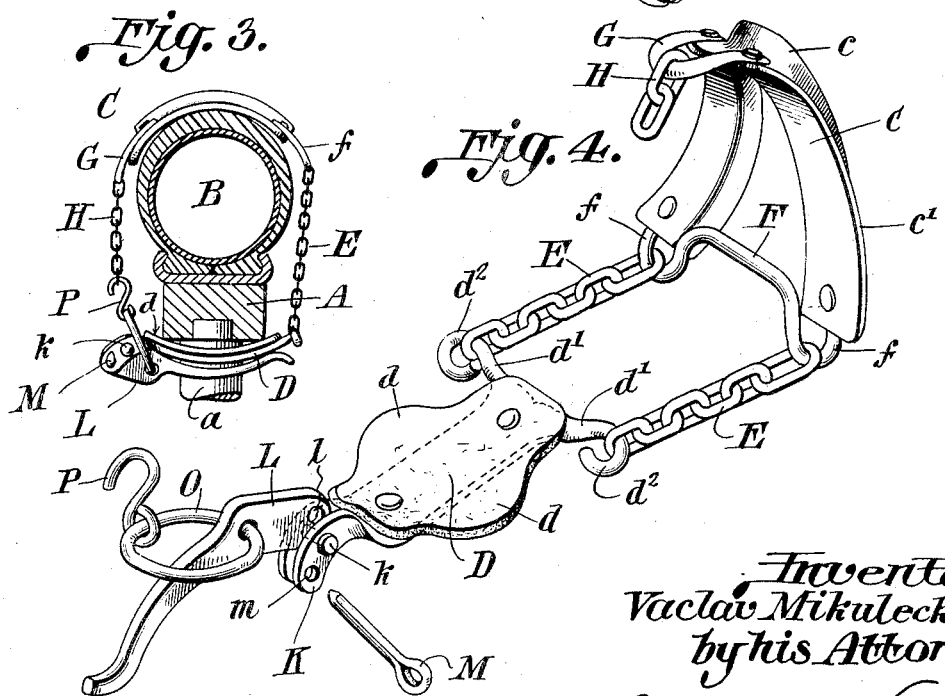
Inventor
Vaclav Mikulecky
by his Attorneys
Baldwin & Wight

UNITED STATES PATENT OFFICE.

VACLAV MIKULECKY, OF VERDIGRE, NEBRASKA.

MUD-GRIP FOR AUTOMOBILE-WHEELS.

1,375,716.   Specification of Letters Patent.   Patented Apr. 26, 1921.

Application filed November 13, 1920. Serial No. 423,823.

*To all whom it may concern:*

Be it known that I, VACLAV MIKULECKY, a citizen of the United States, residing at Verdigre, in the county of Knox and State of Nebraska, have invented certain new and useful Improvements in Mud-Grips for Automobile-Wheels, of which the following is a specification.

This invention relates to tractor grips or mud grips adapted to be applied to motor wheels to assist in getting them out of mud holes or other places where the wheels are apt to slip, and the object of this invention is to provide a simple, inexpensive and efficient device of this class which may be readily applied to or removed from a wheel and which when applied may be firmly locked thereto.

In carrying out my invention, I provide a gripping member of V-shape, having laterally and outwardly projecting base flanges and a bracing cross-piece, which connects the outer ends of the arms of the V and serves to strengthen the grip at this point, and to also provide means for attaching short lengths of chain to the grip member at these points. The opposite end of the grip is provided with a loop or eye to which another short length of chain may be attached. The gripping member is curved correspondingly with the curvature of the wheel tire and is adapted to rest or bear on the periphery thereof, being arranged crosswise of the tire. The three short lengths of chain above referred to are connected to a locking plate, adapted to be applied to the inside of the rim of the wheel. This locking plate is provided with a cushion on its inner side adapted to bear on the inside of the wheel rim and it is provided at one end with two laterally projecting arms having hooks or eyes adapted to engage the two short lengths of chain attached to the outer ends of the arms of the gripping member. At its opposite end the plate carries a lever which is pivotally connected to a projection from the plate and this lever is connected with the single short length of chain attached at the angle of the V-shaped gripping member. This connection between said short length of chain and the lever is with the longer arm of the lever a short distance beyond its pivot. The shorter arm of the lever is formed with a transverse hole which is adapted to register with holes in the adjacent projection from the locking plate. The arrangement is such that the mud grip may be readily applied to a wheel, and when applied the locking lever is connected by flexible connections with the single length of chain and then the lever is turned so as to assume a nearly parallel position with reference to the locking plate, and in such manner as to bring the hole in the lever in register with the holes in the projections to which the lever is pivoted. A cotter pin or other similar locking device is then inserted through the three holes and the lever is then firmly locked with the chains under strain and the grip firmly connected with the wheel. By removing the cotter pin and swinging the locking lever outward the connections may be loosened and the grip removed from the wheels.

In the accompanying drawings:—

Figure 1 is a side elevation of a portion of an automobile wheel with two of my improved mud grips applied thereto.

Fig. 2 is a plan view of the parts shown in Fig. 1.

Fig. 3 shows a transverse section of the mud grip locked to the wheel.

Fig. 4 is a perspective view of the different parts of the mud grip with the parts distended so as to more clearly show the construction.

A portion of the rim of an automobile wheel is shown at A. $a$ indicates one of the spokes and B a portion of a pneumatic tire. The mud gripping device C is of general V-shape, having flanges $c$ adapted to engage the ground and base flanges $c'$ which stiffen the device. A locking plate D is lined with leather or other suitable cushioning material $d$, and this plate is provided with laterally projecting arms $d'$, having eyes $d^2$ at their outer ends to which are permanently connected short lengths of chain E. These short lengths of chain are connected at their outer ends with loops or eyes $f$, formed on a cross-piece or brace F which is attached to the outer ends of the arms of the V-shaped gripping member. This cross-piece F serves to stiffen the member C where the arms are spread at their outer ends and also provides the loops or eyes $f$ to which the short lengths of chain E are flexibly but permanently connected. At its opposite end the gripping member C is provided with a loop G to which a single short length of chain H is permanently but flexibly connected.

The locking plate D is formed at its end opposite the end where the loops $d^2$ are provided, with arms K, there being a space between the two arms to receive the inner portion of a locking lever L. This lever is pivoted to the arms at $k$. The outer portions of the arms are formed with holes $m$ which are in line with each other and which are adapted to receive a cotter pin M. The lever L is formed with a hole $l$ which is adapted to register with the holes $m$ and to allow the cotter pin to pass through it. The pivotal connection between the arms K and the lever is a permanent one and the lever is adapted to be swung to such an extent, as shown in Fig. 4, that the chains may be released. A ring O is connected with the lever L a suitable distance beyond its pivot $k$ and this lever carries a hook P which is adapted to engage the outer or lower link of the short chain H.

When the parts are in the position shown in Fig. 4 the device, as a whole, may be applied to an automobile wheel, the gripping member C being disposed as indicated in Figs. 1 and 2, and the locking plate D being arranged under the rim of the wheel. Then the hook P is made to engage the chain H. Then the lever L is turned about its pivot until it assumes the position shown in Fig. 3, being practically parallel with the locking plate D. When in this position the cotter pin M is inserted and the lever L is held in locked position. Experience has demonstrated that this is a very secure and reliable locking device. The gripping member is held firmly on the wheel without danger of slipping. By merely removing the cotter pin M and swinging the lever downward and outward the connections may be loosened and the mud grip detached from the wheel with great celerity.

I claim as my invention:—

1. A mud grip comprising a V-shaped gripping member having a cross-piece for bracing the outer ends of the arms of the V, locking devices, short lengths of chain connecting the locking devices with said cross-piece, and a short length of chain connecting the locking devices with the opposite end of the gripping member.

2. A mud grip comprising a gripping member, a locking plate having laterally projecting hooks, a short length of chain connecting each of said hooks with one end of the gripping member, parallel arms extending from one end of the locking plate, a locking lever pivotally connected between these arms near its inner end, a chain connecting this lever between its inner and outer ends with the gripping member, and a device for engaging the lever and said arms for locking the lever in locked position.

3. A mud grip comprising a gripping member, a locking plate, flexible connections between one end of the gripping member and one end of the locking plate, parallel outwardly projecting arms on the outside end of the gripping plate having transverse holes at their outer ends, a locking lever pivotally connected with the arms between said holes and the inner ends of the arms, and having a transverse hole near its inner end, flexible connections between the locking lever and the gripping member and a pin which passes through the transverse holes in the arms and the lever for holding the locking lever in locked position.

In testimony whereof, I have hereunto subscribed my name.

VACLAV MIKULECKY.